United States Patent [19]

Hurt

[11] 4,190,976
[45] Mar. 4, 1980

[54] FISHING LIGHT

[76] Inventor: Brian D. Hurt, 712 Red River, Austin, Tex. 78701

[21] Appl. No.: 920,170

[22] Filed: Jun. 29, 1978

[51] Int. Cl.$^2$ .............................................. A01K 97/00
[52] U.S. Cl. .................... 43/17.5; 43/42.31; 362/267
[58] Field of Search ............. 43/17.5, 17.6, 43.1, 43/42.31; 362/263, 267

[56] References Cited

U.S. PATENT DOCUMENTS

| | | | |
|---|---|---|---|
| 1,192,001 | 7/1916 | Ryan . | |
| 1,663,465 | 3/1928 | Neff . | |
| 2,786,131 | 3/1957 | Zador . | |
| 2,864,195 | 12/1958 | Bachmann | 43/17.5 X |
| 3,209,138 | 9/1965 | Moore . | |
| 3,464,139 | 9/1969 | Eggers | 43/43.1 |
| 3,502,861 | 3/1970 | Evans . | |
| 3,579,269 | 5/1971 | Ostensen . | |
| 3,617,733 | 11/1971 | Adams | 43/17.5 |
| 3,652,846 | 3/1972 | Starck | 362/263 |
| 3,680,245 | 8/1972 | Brooks . | |
| 3,720,824 | 3/1973 | Callahan | 362/267 |
| 3,798,822 | 3/1974 | Lampus | 43/43.1 |
| 3,917,939 | 11/1975 | Schmidt | 362/267 |
| 3,949,212 | 4/1976 | Larrimore | 362/263 |

FOREIGN PATENT DOCUMENTS 780725  3/1968  Canada ...................... 43/17.5

*Primary Examiner*—Nicholas P. Godici
*Attorney, Agent, or Firm*—Roylance, Abrams, Berdo & Farley

[57] ABSTRACT

A fish attracting device which produces both light and sound when immersed in water includes a halogen-filled quartz envelope lamp, the base portion of which is enclosed in an insulating elastomer and then enclosed in a body of material such as lead having significant negative buoyancy. About half of the lamp envelope is exposed to the water and is protected by a wire cage. Conductors extend from the lamp wires through the molded body and can be used to suspend the device from a boat. The lamp, when submerged and energized, produces intense light and a crackling sound which is attractive to fish. A method of making the device is also disclosed.

8 Claims, 4 Drawing Figures

FISHING LIGHT

This invention relates to an apparatus for producing sound and light to attract fish, and to a method of making the apparatus.

BACKGROUND OF THE INVENTION

It is well-known that light can be used to attract fish, and various devices have been produced in the past to produce light, the devices being in a convenient form to direct the light into water in the vicinity of a fishing boat, for example, so that fish can be attracted to the vicinity of the boat to be caught. It is also known that generating sound below the surface of the water serves a similar purpose, and that the creation of both light and sound in the subsurface area in the vicinity of a boat improves the catch. Examples of prior art devices which have been developed for this purpose are found in the following patents:

U.S. Pat. No. 1,192,001—Ryan
U.S. Pat. No. 1,663,465—Neff
U.S. Pat. No. 2,786,131—Zador
U.S. Pat. No. 3,209,138—Moore et al
U.S. Pat. No. 3,464,139—Eggers
U.S. Pat. No. 3,502,861—Evans
U.S. Pat. No. 3,579,269—Ostensen
U.S. Pat. No. 3,680,245—Brooks As will be seen from these patents, various kinds of light producing and sound producing devices have been used, including those which float on the surface of the water with a lamp mounted so that the light is directed downwardly into the water, as well as devices which are submerged and which contain a lamp and also, in the case of the Brooks patent, which contain a separate speaker and signal generator to generate sound.

Because of the fact that the water presents a relatively hostile enviornment for electrical devices to produce the light and sound, these prior art attracting means are relatively complicated and are not always particularly reliable or durable over a period of time. Also, it has generally been necessary to provide separate devices for the production of light and sound.

BRIEF DESCRIPTION OF THE INVENTION

An object of the present invention is to provide an extremely simple apparatus for the simultaneous production of light and sound, when the apparatus is immersed in water.

A further object is to produce a device which is sufficiently heavy so that it tends to sink by itself into the water, and which produces not only an intense light but a form of sound which is particularly attractive to fish.

A further object is to provide a device which is relatively simple to produce and is concurrently rugged, inexpensive and highly efficient.

Yet another object is to provide a simple method for producing an apparatus of the type described.

Briefly described, the invention includes a submersible device for attracting fish by light and sound comprising a lamp bulb having a quartz envelope, a filament within the envelope and conductive wires extending from the filament through one end of the envelope, a body molded around the portion of the envelope through which the wires extend and leaving the other end of the envelope exposed, the body having a density significantly greater than water, and protective cage means attached to the body and encompassing the exposed other end of the envelope, the cage means having openings therethrough to permit water to reach the exposed portion of the envelope when the device is immersed in water whereby, when the conductor means are connected to an energy source, the bulb produces light and, by interaction with the water, produces sound, tending to attract fish.

In a preferred embodiment of the apparatus, the molded body is, at least in major part lead.

The invention also contemplates a method of making a submersible device for attracting fish the method comprising the steps of providing a bulb having a quartz envelope, a filament within the envelope, and wires extending from the filament through an end of the envelope, connecting elongated, insulated electrical conductors to the wires, surrounding the exposed electrically conductive portions of the wires, the conductors and the points of connection with a curable electrically non-conductive material, providing a mold having a larger open end and a smaller open end, supporting the mold with the larger open end facing outwardly, placing the bulb and conductors in the mold with the bulb near the larger end and with the conductors extending through the smaller end, providing a plug in the smaller end which, along with the conductors, substantially closes the smaller end, pouring into the mold a hardenable casting material until the level of the material in the mold reaches above the lower end of the bulb but below the upper end thereof so that a portion of the envelope protrudes beyond the casting material, and permitting the material to harden.

In order that the manner in which the foregoing and other objects are attained in accordance with the invention can be understood in detail, particularly advantageous embodiments thereof will be described with reference to the accompanying drawings, which form a part of this specification, and wherein.

Figure 1:
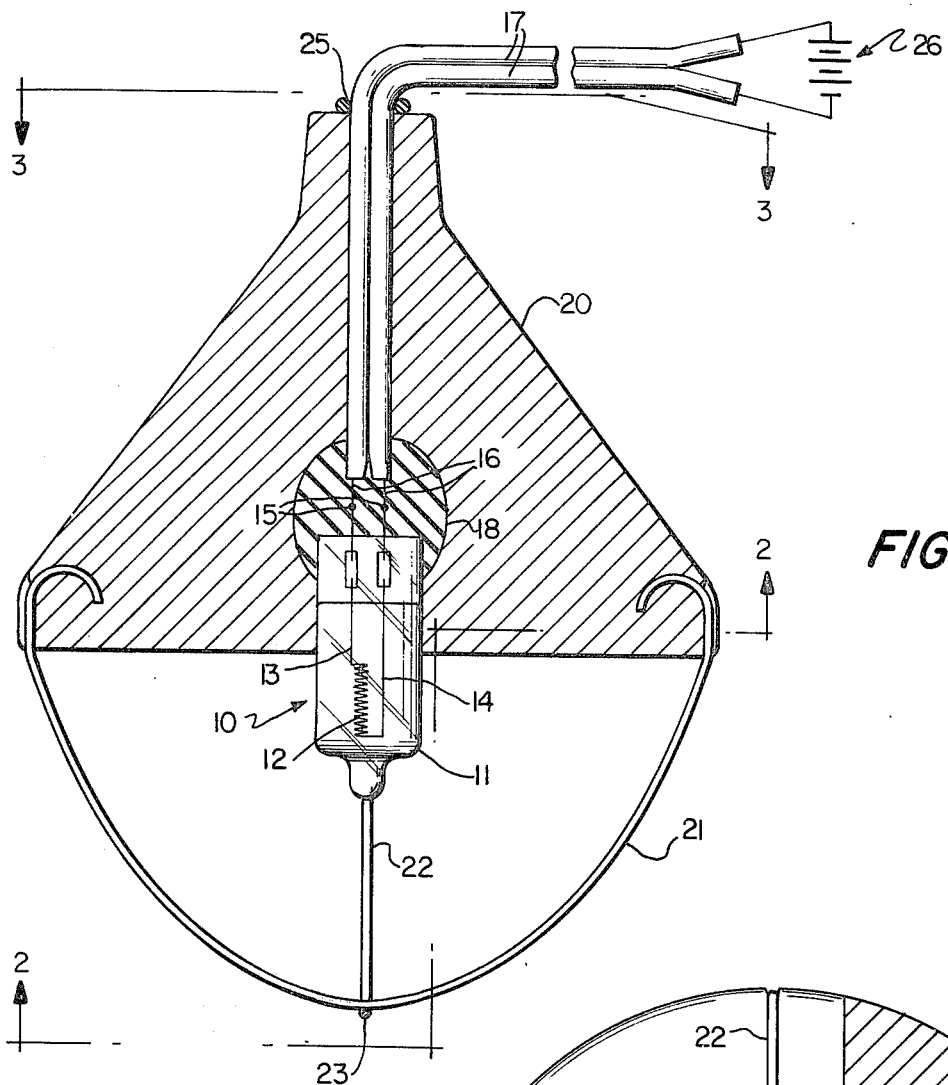
FIG. 1 is a side elevation, in partial section, of a fish attracting device in accordance with the invention.
Figure 2:
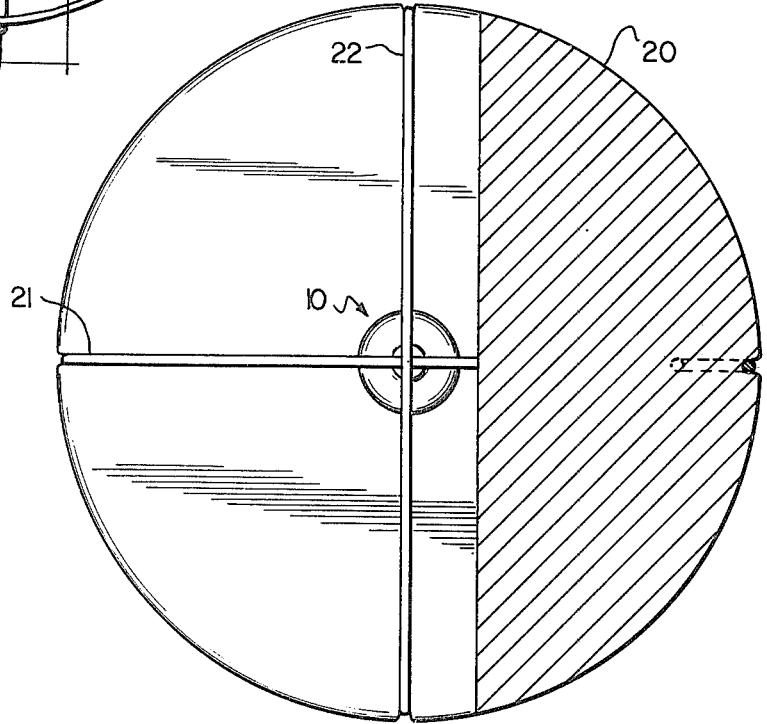
FIG. 2 is a bottom plan view, in partial section, along line 2—2 of FIG. 1.
Figure 3:
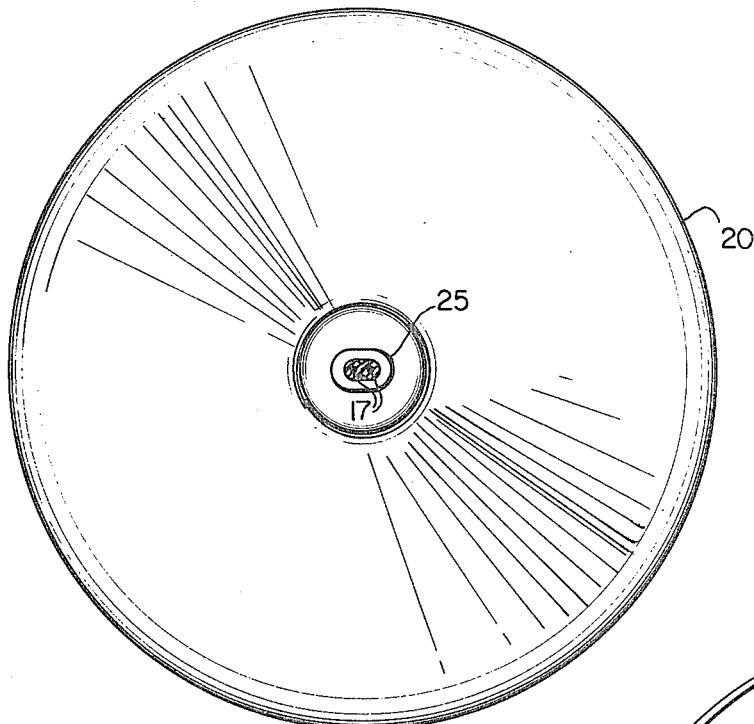
FIG. 3 is a top plan view, in partial section, along line 3—3 of FIG. 1.

As shown in FIGS. 1-3, the apparatus includes a lamp indicated generally at 10 which has a quartz envelope 11 containing a filament 12 connected to wires 13 and 14 which extend from the filament through the glass base of the bulb and protrude beyond the end thereof. These wires are connected, as by soldering indicated at 15, to exposed portions 16 of a pair of insulated electrical conductors 17. The exposed end portions 16, the solder connections 15 and the protruding wires 13 and 14 are totally surrounded by a body of insulating material 18.

The characteristics of the lamp 10 are of particular importance to the present invention, particularly in that the envelope thereof should be of a quartz material. Additionally, it is desirable, although not essential, that the envelope be halogne-filled. Several forms of lamps are currently available on the market and are quite satisfactory for use in the present invention. Examples thereof are the H2 lamps manufactured by Phillips, a 12-volt, 55-watt lamp which is believed to be a tungsten-iodine lamp. Lamps identified as Types H-2 and H-3 produced by various manufacturers are suitable for the purpose.

A lamp rated for use with a 12-volt source is, of course, a desirable choice if it is to be operated from a small boat having only a 12-volt electrical system. However, quartz-iodine bulbs are available in various ratings from 6 volts to 120 volts for use with automotive headlights and taillights, aircraft landing lights, and motion picture scene illumination and projector lamps. These lamps are capable of producing from about 1,000 lumens to about 30,000 lumens.

Normally, the quartz-halogen bulbs are supplied with a formed sheet metal base portion enclosing the flattened base end portion of the quartz glass envelope and also the wires emerging therefrom, the sheet metal being mechanically and electrically attached to those wires. For purposes of the present invention, the sheet metal base should be removed from the envelope in order to expose the wires emerging from the envelope before they are connected to the stripped ends 16 of conductors 17. The conductors 17 can be ordinary lamp cord such as the cord known by the designation SPT-1. Preferably, cord with a relatively high temperature characteristic insulation should be used, but it has been found that conventional cord having wire designated for operation at household current of about 10 amperes is adequate.

The elastomeric material 18 used to surround the exposed wires and the solder connection can be a commercially available silicone sealer which comprises silicone rubber in an acetic acid solution, this elastomer being formable around the conductors and curable to form a ball of insulation encompassing the exposed conductive portion.

Surrounding and enclosing the base portion of the bulb, the elastomer 18 and a portion of conductors 17 is a body 20 which, in the embodiment shown, is metallic lead. The lead is formed around these components in a mold, to be described hereinafter in further detail, to form a body which is rugged and which is of sufficient mass to readily sink at the end of conductors 17 which are used as the suspending cord for the light. While the exact shape is by no means critical, a suitable configuration for the body is the generally frustoconical shape illustrated in FIGS. 1-3 with the bulbs protruding from the center of the larger end thereof, at least half of the envelope being exposed.

As illustrated in FIG. 1, the arrangement of the quartz envelope 11 relative to the body 20, in which a portion of the envelope 11 is surrounded by the body 20 while its remaining portion is left exposed by the body 20, provides a portion on the envelope 11 which is at an interface between the water and the body. It is at this interface that the crackling sound which attracts the fish is produced by the temperature differential existing between the portion of the envelope 11 located within the body 20 and the portion of the envelope 11 exposed to the water.

A protective cage including stainless steel wires 21 and 22 is provided protruding from the larger end of body 20 surrounding and spaced from the bulb. Wires 21 and 22 constitute a protective device to prevent lamp 10 from being damaged, the wires being relatively thin and few in number to minimize interference with the light transmitting characteristics of the lamp. Each of the wires is formed in a generally U shape, each end of each U being hooked at 33 to form a mechanical engagement within body 20 to prevent removal thereof. The wires can be bent and connected to each other as by brazing or silver soldering at their junction point 23.

At the small end of the body 20, conductors 17 extend outwardly and, after the body has been formed, a seal 25 can be provided around the conductors. It has been found that this seal can be formed with hot glue. A seal can be formed, with alpha cyanoacrylate, around the lamp 10 at the point of emergence of envelope 11 from the larger base of the body.

Conductors 17 are, of course, somewhat longer than illustrated in FIG. 1. A length of about 10 feet is suitable in that this permits the light to be lowered into the water and permits the ends of the conductor to be connected to a source of power, such as schematically illustrated as a battery 26 by any convenient electrical connector means.

Figure 4:
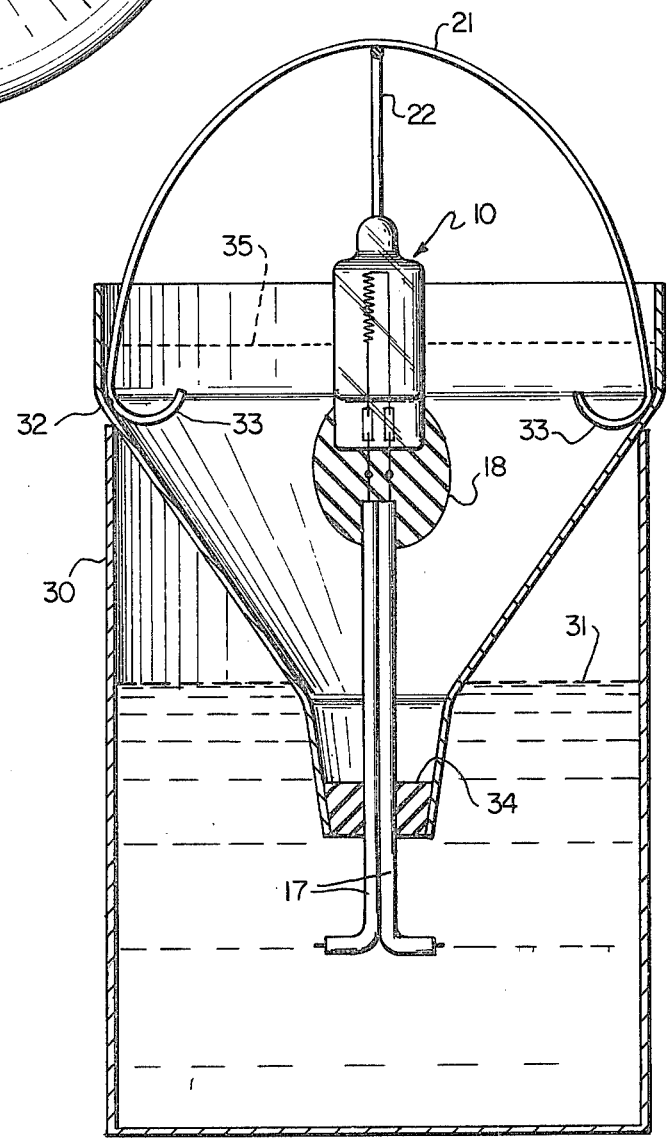
FIG. 4 is a side elevation, in partial section, of a mold apparatus suitable for producing a device in accordance with FIGS. 1-3.

A method of making the apparatus described in connection with FIGS. 1-3 will be discussed with reference to FIG. 4. As shown therein, a simple water-cooled mold for making the apparatus will be seen to include a container 30 which can be a metal can which is partially filled with water 31. The mold itself can consist simply of a conventional household funnel 32, the dimensions of one used for this purpose being about $2\frac{1}{4}''$ in diameter and $2\frac{1}{2}''$ in length. Clearly, the container 30 should be chosen such that the larger portion of the funnel rests on the upper edges thereof, or else a support member across the top of the container 30 must be supplied. It will be observed that the water level need only be high enough to cover the small neck of the funnel.

Wires 21 and 22 are preformed into a cage with hook end portions 33 and shaped so that the wire cage rests approximately at the junction between the cylindrical portion of the funnel and the conical portion thereof. Suitable wire for this purpose is 0.035 stainless steel wire which is generally available.

Lamp 10 is then prepared, as described above, by removing the sheet metal base portion thereof. The exposed wires protruding therefrom are then connected to stripped end portions of conductors 17 in conventional fashion. A silicone sealer is applied around the base portion of the bulb and the exposed conductors and permitted to cure to a hardened state. After the curing is completed, the bulb and wires are mounted in the funnel with the wires protruding through the lower end thereof and surrounded by a rubber grommet 34 which is simply an annular member having a central hole through which the wires protrude, the outer diameter being of a suitable size to engage the interior of the small end of the funnel so that the wires and the grommet essentially close the funnel end.

It should be noted, at this point, that the bulb and wire assembly is positioned in the funnel so that approximately the midpoint of the bulb is in a plane defined by a line 35 around the cylindrical portion of the funnel and below the upper edge thereof. Line 35 defines the point to which lead or other casting material will be supplied in the funnel, and also defines the point to which the envelope of the bulb will be covered by body 20. Normally, wires 17 are sufficiently stiff to maintain the bulb in this desired position without other support, although additional support members extending across the upper end of the funnel can be used if desired or needed.

The preformed cage including wires 21 and 22 is then placed in the funnel and casting material, such as molten lead, is poured into the funnel until it reaches level 35. The cooling water 31 prevents degeneration of the grommet and wire at the lower end of the funnel. It will be observed that the casting material encompasses hook portions 33 of the cage and completely encloses the lower portion of the bulb as well as the elastomer 18.

After the casting material has completely hardened to form body 20, the body can simply be slipped out of the funnel and the seals around the junction between envelope 11 and the base of body 20 and around the point of emergence of conductors 17 can be formed.

The body can then be painted, preferably with epoxy paint, and preferably using a white paint around the face of the body near the bulb for improved reflection characteristics.

Of particular significance is the fact that the quartz halogen bulb burns at an extremely high temperature and interacts with the water to produce a continuous crackling sound which is believed to be highly attractive to fish. The quartz glass envelope of the bulb withstands the temperature changes and shocks involved not only in the process of forming the apparatus, when molten lead is poured into the mold, but also the enviornment in which it is used, underwater. The bulb is normally designed to be operated at a very high temperature but is, of course, cooled by the water in which it is used. It is believed that the apparatus thus described should not be connected to a source of power outside the water because of the fact that a significant portion of the envelope is enclosed by body 20 and is not, therefore, capable of dissipating heat. Such use may shorten the life of the bulb. However, it is believed that the use underwater may contribute to lengthening the life of the bulb.

It has been found that an H-2 bulb connected to a conventional automotive battery supplying 12 volts burns with an intense light, attracts fish efficiently, and uses relatively little power. Thus, such a bulb can be used through a major portion of a night of fishing and still leave power in a battery which was reasonably well-charged initially.

While lead has been described as the casting material for body 20, it will be recognized that various other materials can be used. It is desirable that body 20 be sufficiently heavy so that it readily sinks and can be handled easily at the end of the conductors 17. However, epoxy resin or fiber glass resin, preferably with lead pellets incorporated therein can be used, and other materials may occur to the reader. Lead is, however, simple and relatively inexpensive to use as described.

While certain advantageous embodiments have been chosen to illustrate the invention, it will be understood by those skilled in the art that various changes and modifications can be made therein without departing from the scope of the invention as defined in the appended claims.

I claim:

1. A submersible device having means for producing light and sound for attracting fish comprising
    a lamp bulb with a quartz envelope, a filament within said envelope and conductive wires extending from said filament through one end of said said envelope; and
    a body provided around a first portion of said envelope at said one end through which said wires extend, said body leaves at least a second portion of said envelope adjacent its other end exposed;
    whereby, when the device is immersed in water and said wires are connected to an energy source, said second portion of said envelope is in contact with water to produce both light and sound tending to attract fish.

2. A device according to claim 1, wherein said body is molded around said first portion at said envelope.

3. A device according to claim 1, wherein protective cage means is coupled to said body and encompasses said second portion of said envelope, said cage means has openings therethrough to permit water to reach said second portion when the device is immersed in water.

4. A device according to claim 1, wherein said body is formed of epoxy resin.

5. A device according to claim 1, wherein said envelope has a generally cylindrical latteral surface and said body is provided only around a portion of said lateral surface.

6. A device according to claim 1 wherein said bulb further includes halogen gas contained within said envelope.

7. A device according to claim 1 wherein said body consists essentially of lead.

8. A device according to claim 1 wherein at least a portion of said body is lead.

* * * * *